April 19, 1932.                I. GONYK                1,855,106
VALVE
Filed Feb. 8, 1929
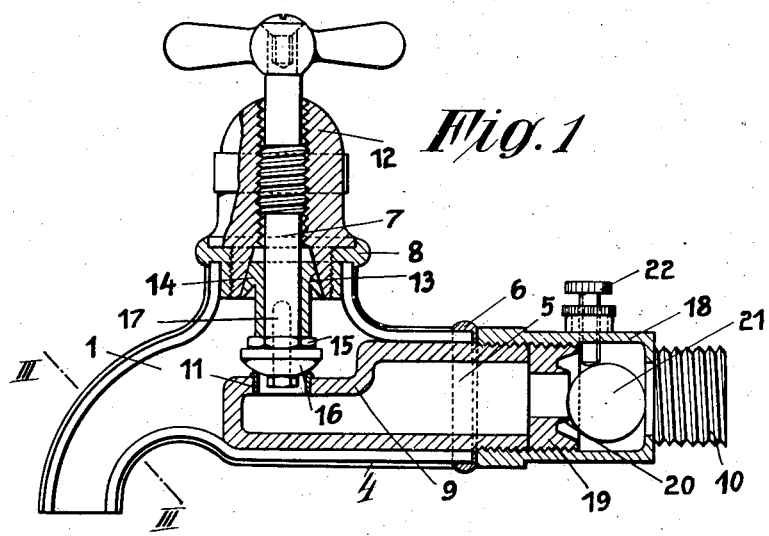
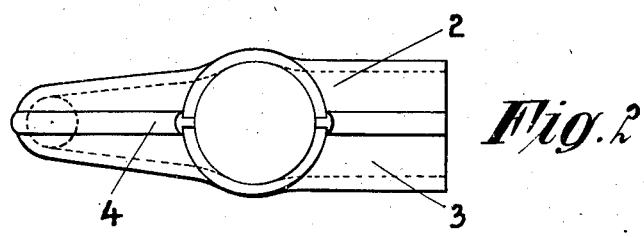
Inventor
Ignatz Gonyk
By Munn & Co
Attorneys Patented Apr. 19, 1932

1,855,106

UNITED STATES PATENT OFFICE

IGNATZ GONYK, OF VIENNA, AUSTRIA

VALVE

Application filed February 8, 1929, Serial No. 338,556, and in Austria October 3, 1928.

My invention relates to valves and more particularly to delivery valves for ducts for fluid under pressures. The object of my invention is to reduce the costs of manufacture and the weight of such valves.

With this object in view the essence of my invention consists in that the casing of the valve consists of two substantially symmetrical halves pressed of sheet metal and held together by interposed strips. Such casings are much cheaper and less in weight than the cast casings heretofore in use. A further feature of my invention consists in that for the complicated gland packing a much simpler and fully reliable leather packing is substituted. Another feature of my invention consists in providing a ball valve in front of the valve proper, such ball valve being capable of being forced against its seat by the fluid under pressure to be delivered by the valve proper and to be held in any desired open position by a pin adjustable longitudinally. This ball valve is an auxiliary valve but it also may be used to control the quantity of fluid admitted to the valve per unit of time, more particularly for gauging purposes.

In the annexed drawings I have shown by way of example a constructional form of my invention as applied to a liquid delivery valve.

Fig. 1 is a side elevation partly in section of a liquid delivery valve, one half of the casing of the valve proper being removed. Fig. 2 is a plan view of the casing. Fig. 3 is a section on the line III, III, Fig. 1.

The casing 1 of the valve proper comprises two symmetrical halves 2 and 3 held together by strips 4, tightly connected to the contiguous edges of the said halves by brazing or welding. Around the entering opening 5 of the casing an abutment ring 6 is secured, and around the opening for the valve spindle 7 a ring 8 is secured, by welding or brazing. For stiffening the casing and for receiving the seat 11 of the valve proper a tubular structure 9 is provided which tightly fits within the ring 6 and the liquid entrance opening 5 and extends on the one hand into the casing and on the other hand, beyond the ring 6, this latter extending part carrying a screw thread. The inwardly extending part 9 carries the seat 11 of the valve proper 16.

A nut 12 is screwed into the ring 8 and is provided on its inside with the female thread for the valve spindle 7. The lower end of the nut 12 is provided with an upwardly extending seat 13 and between this seat the valve spindle 7 and a nut 15 screwed on this spindle is interposed the elastic packing body 14 of leather or other suitable material. The body 16 of the valve proper is mounted on the valve spindle 7 by means of a bolt 17. On screwing the valve spindle 7 upwards, the packing body 14 is pressed against its seat 13 whereby a perfectly tight joint is obtained between the packing body on the one hand and its seat 13 and the valve spindle on the other hand. When the valve is opened the pressure of the liquid acting on the outside of the packing body assists in still more tightening the joint.

In a casing 18, screwed on the outwardly extending part of the tubular structure 9 (Fig. 1) is secured a ball valve seat carrier 19 provided with a ball valve seat 20 with which cooperates a valve ball 21 loosely mounted in the said casing 18 between the seat 20 and the screw threaded end of this casing. The diameter of the valve ball exceeds that of the bore of this screw threaded end. Furthermore a stop bolt 22 mounted on the casing 18 cooperates with the valve ball 21 and is adjustable longitudinally say by being screwed into the casing 18 and projecting inwards so as to come into contact with the valve ball 21 as is clearly seen from the drawings. The casing 18 possesses a tubular part 10 carrying a screw thread for screwing the valve as an entirety into a supply pipe (not shown).

Whenever the valve proper 16 is opened the fluid under pressure delivered therethrough tends to force the valve ball 21 against its seat 20, but this valve ball is stopped at a distance from this seat depending of the adjustment of the stop bolt 22. Thereby the free passage area of the fluid under pressure through the seat 20 may be readily controlled and if the stop bolt 22 is so adjusted as to fully release the valve ball the latter is tightly forced against its seat by the fluid under pressure thereby shutting off the delivery of the said fluid independently of the valve proper 16, as is required in case of repair or exchange of the valve proper or the parts associated thereto.

What I claim is:

1. A delivery valve for liquids, comprising a casing having an inlet opening, a valve spindle opening and a delivery opening, said three openings being located substantially in the plane of symmetry of the casing, said casing consisting of two substantially symmetrical parts pressed of sheet metal and of metal strips tightly secured to and engaging the contiguous edges of said halves and extending along the entire length of said edges but leaving free said openings, in combination with a ring secured around said valve spindle opening, and a second ring secured around said entering opening, a valve spindle nut secured to said first ring, a screw threaded valve spindle engaging said valve spindle nut, a valve body secured to the inner end of said valve spindle, a tubular structure tightly fitting said second ring, said tubular structure extending into the casing and carrying a valve seat opposite the said valve body and adapted to engage with said valve body, said tubular structure extending also beyond the said second ring to the outside of the casing and being open at its outwardly projecting end, and means for connecting the outer end of the said tubular structure to a liquid duct.

2. A delivery valve for liquids, comprising a casing having an inlet opening, a valve spindle opening and a delivery opening, three openings being located substantially in the plane of symmetry of the casing, said casing consisting of two substantially symmetrical parts pressed of sheet metal, and of metal strips tightly secured to and engaging the contiguous edges of the said halves and extending along the entire length of the said edges, but leaving free said openings, in combination with a ring secured around said valve spindle opening and a second ring secured around said entering opening, a valve spindle nut secured to the said first ring, a screw threaded valve spindle engaging said valve spindle nut, a valve body secured to the inner end of said valve spindle, a packing-body seat at one end of the said valve spindle nut converging away from the valve body, an elastic packing body mounted on the said valve spindle and interposed between the said valve body and said seat and adapted to engage with said seat, a tubular structure tightly fitting said second ring, the said tubular structure extending into the casing and carrying a valve seat opposite the said valve body adapted to engage with said valve body, the said tubular structure also extending beyond the said second ring to the outside of the casing and being open at its outwardly projecting end, and means for connecting the outer end of the said tubular structure to a liquid duct.

In testimony whereof I affixed my signature.

IGNATZ GONYK.